May 30, 1950 J. R. WINTER, JR 2,509,661
ROCKER ARM LUBRICATION
Filed Oct. 27, 1944
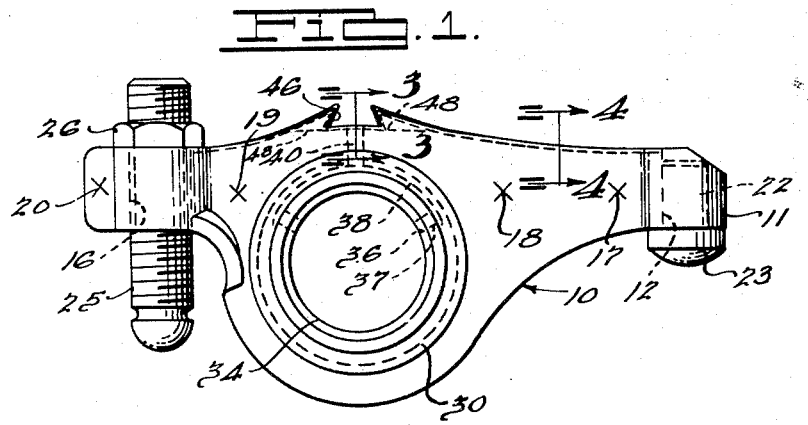
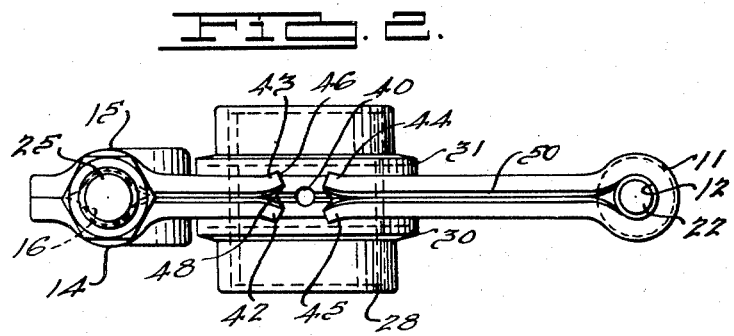
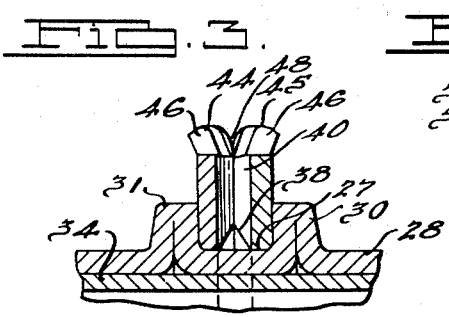
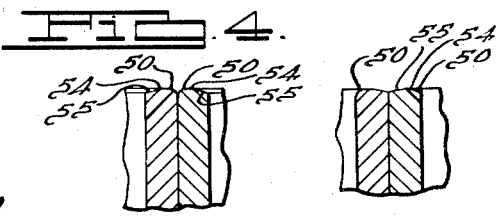
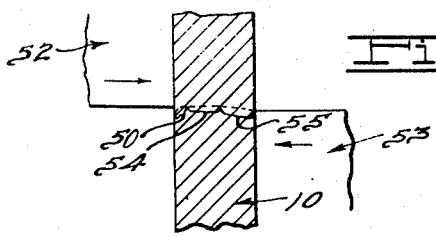
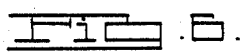
INVENTOR.
John R. Winter, Jr.
BY
Harness, Dickey & Pierce
ATTORNEYS.

Patented May 30, 1950

2,509,661

UNITED STATES PATENT OFFICE 2,509,661

ROCKER ARM LUBRICATION

John R. Winter, Jr., Detroit, Mich., assignor, by direct and mesne assignments, to John R. Winter, Sr., Detroit, Mich.

Application October 27, 1944, Serial No. 560,532

16 Claims. (Cl. 184—6)

The invention relates to internal combustion engines and it has particular relation to a rocker arm.

In certain respects the subject matter involved is similar to that embodied in my copending application for patent, Serial No. 545,597, filed July 19, 1944.

In the use of rocker arms, it is important to supply lubricant to opposite ends of the arm and generally this lubricant is supplied from a tubular shaft upon which the rocker arm is mounted. In the conventional type of rocker arm, the lubricant flows through the tubular shaft and outwardly through openings therein to lubricate the bearing surfaces on the arm and shaft and finally a part of the lubricant is conducted to the ends of the arm. It is important that the quantity of lubricant supplied to the end of the arm not be too large because excessive lubrication results in a waste since some of it will flow past the valve and into the cylinder of the engine. The problem of limiting the quantity of oil which flows to the ends of the valve stem is not new and the present invention is concerned with an improved means for effecting this lubricant control.

One object of the invention is to provide an improved type of rocker arm having improved means for controlling the quantity of oil flowing to one or both ends of the arm and accomplishing this result efficiently.

Another object of the invention is to provide a rocker arm having improved lubricant control means wherein the arm may be manufactured more economically to the end that the cost may be substantially reduced.

Another object of the invention is to provide an improved type of rocker arm in the form of a laminated sheet metal wherein improved means are provided for controlling the flow of lubricant along the upper edge of the arm.

Another object of the invention is to provide an arm of the last mentioned character wherein the means for controlling the flow of lubricant is integral with the arm and is formed during stamping operations.

Another object of the invention is to provide a method of making a rocker arm so as to provide lubricant control means on an edge face of the arm.

Other objects of the invention will become apparent from the following description, from the drawings to which it relates and from the claims hereinafter set forth.

For a better understanding of the invention reference may be had to the accompanying drawing wherein:

Figure 1 is a side elevational view of a rocker arm constructed according to one form of the invention;

Fig. 2 is a plan view of the arm shown by Fig. 1;

Fig. 3 is a cross-sectional view on a larger scale taken substantially along the line 3—3 of Fig. 1;

Fig. 4 is a cross-sectional view on a larger scale taken substantially along the line 4—4 of Fig. 1;

Fig. 5 is a view similar to Fig. 4 but showing another form of the invention; and, Fig. 6 is a generally diagrammatic view illustrating the manner in which the dies form the edge of the stamping.

Referring to Figs. 1 and 2, the arm proper comprises a stamping 10 which is folded or bent intermediate its ends to provide a generally cylindrical end 11 having an opening 12. At the opposite end of the arm the laminations are shaped to provide generally semi-cylindrical portions 14 and 15 and these portions jointly form a second opening 16. The laminations may be welded at the points 17, 18, 19 and 20 so as to obtain a rigid laminated structure. Instead of the spot weld 20, or in conjunction therewith, it is preferable also to carbon arc weld the left ends of the two laminations along the vertical edges so as positively to prevent separation of the laminations to the left of the opening 16.

A pin 22 having a head 23 is provided for the arm and the shank of the pin is removably press fitted into the opening 12. The opening 16 at the other end of the arm is threaded and receives a threaded stud 25 which is adjustably locked in position by a lock nut 26 at the upper side of the arm. It will be understood that the arm is to be oscillated and that a moving part engages one end of the arm to raise it while the other end of the arm engages a spring pressed valve stem.

The arm intermediate its ends has a shaft receiving opening 27 and a tubular element 28 is provided in this opening which is locked to the arm by forming outwardly bulbed heads 30 and 31 engaging opposite sides of the arm. A bearing sleeve 34 is provided within the element 28 and the sleeve receives a tubular shaft (not shown). Oil is supplied to the interior of the shaft and reaches the inner surface of the sleeve 34 by means of radial openings in the shaft. Openings 36 and 37 in the sleeve 34 and in the tubular element 28 lead to a circumferentially extending groove 38 formed between the edges of the laminations and around the opening 27 therein and this groove communicates with an upwardly extending opening 40 leading to the upper edge of the arm. Generally, the arm so far described corresponds to that embodied in my copending application for patent and the parts may be manufactured and assembled in substantially the same manner.

It should be understood from the description herein given and also from my copending application for patent that lubricant applied to the interior of the bearing sleeve 34 also finds its way to the groove 38 and flows upwardly through the opening 40 to the upper edge of the arm. The present invention is concerned with controlling the flow of the lubricant from the upper end of the opening 40 to opposite ends of the arm.

For accomplishing this result, each lamination of the arm is formed with an upwardly directed projection or ear at each side of the opening 40 and these projections or ears are indicated in Fig. 2, at 42, 43, 44, and 45. As shown best in Fig. 1, each of the ears 42, 43, 44, and 45 has its face next to the opening 40 inclined upwardly and towards the axis of the opening as indicated at 46 and from this it follows that the adjacent edge faces of the projections or ears on both sides of the opening 40 converge upwardly. Any oil flowing upwardly out of opening 40 and to the right and left thereof along the edge faces of the arm thereby is prevented from flowing upwardly and over the ears.

Lubricant is allowed to flow past the ears by pressing them radially apart as seen in Figs. 2 and 3 so as to provide a V-shape channel which is indicated at 48. It will be appreciated that if the ears are not pressed radially apart their inner and inclined edge faces 46 would preclude lubricant from flowing from the opening 40 to either end of the arm but by bending the ears apart, a channel is formed which permits the flow of oil. It follows also that the amount the ears are pressed apart will govern the size of this V-shape channel and hence govern the amount of oil that can flow through it. Fundamentally, therefore, the oil control includes a dam formed by two laminated projections wherein the projections may be bent apart or towards each other to permit the desired amount of oil to flow through the dam.

Additionally, the inclined faces 46 of the ears 42 and 43 are angled laterally towards the outer sides of the arm in diverging relation as seen in Fig. 2 so that oil flowing out of opening 40 and to the left will largely be guided laterally in opposite directions by the faces 46. From this, it should be understood that the faces 46 not only are inclined upwardly and towards the axis of opening 40 but they also diverge away from the hole to promote the lateral flow of oil. The faces 46 will obtain a certain degree of angularity in this manner due to pressing the ears apart but they have an additional angularity due to the line of shear break as will be mentioned presently. The faces 46 of the ears 44 and 45 are formed in the same way. Therefore, at each side of the opening 40 the oil flowing out of the opening and thrown towards the ears will largely be guided laterally of the arm and over its side edge where it will flow onto the tubular element 28. A part of the oil will tend to flow through the channel 48 between the ears and the actual quantity that will flow between them will depend upon the amount they are spread apart.

In order further to govern and facilitate the flow of oil, the edges of the laminations are slightly tapered towards each other, as indicated at 50, 50 in Figs. 2 and 4 and jointly form a shallow, V-shape groove extending along the meeting edges of the laminations. The groove thus formed extends from the opening 40 to each pair of ears and there it joins the V-shape gate or opening 48 between the ears and this gate in turn merges with the groove at the other side of the ear. Thus, the lubricant groove in effect is continuous since the gate or opening 48 has its bottom substantially at the bottom of the groove. Oil then will flow from the opening to either end of the arm along a continuous groove which includes a gate which may be adjustably controlled in size.

Referring to Figs. 4 and 6, the groove formed by the edges of the laminations results from the stamping operation where a cutting ring or female die 52 cooperating with a male die 53 cuts the stamping from sheet metal and as will be recalled, the stamping its first in an unbent condition and thereafter is folded into laminated form. When the cutting ring presses into the sheet metal, a cutting action does not instantly occur as some distortion first occurs. This distortion effects the rounded edge 50. Beyond the rounded distortion, a cutting action occurs as indicated by the edge portion 54 and this portion is substantially normal to the plane of the sheet. Finally, the metal breaks through shear and the edge portion resulting from this action is indicated at 55. While the angularity of the edge portions 50 and 55 in Fig. 4 may be slightly exaggerated, they illustrate that a groove is formed for the oil and also that the surfaces 55 taper laterally a slight amount and under certain circumstances this may be desirable to cause excessive oil to flow laterally.

The distortion of the metal in the initial pressure on the sheet may be varied by varying the degree of sharpness of the edge of the cutting ring die 52 so that the size of the groove can be varied accordingly. Also the angularity of the shear break may be also governed as will be understood by those skilled in the art of sheet metal stamping operations.

At the same time that the metal is struck out from the sheet, recesses may be provided in the dies to cause the ears to be bent as they are cut or struck out. In other words, during the stamping operation, the ears are formed and at the same time bent laterally. Since the arm initially is in an unbent condition the ears will all be bent in one direction but when the metal is folded to form the laminated arm the ears in each pair will then be bent oppositely as has been described. It follows from this description that the lubricant groove in the upper edge face of the arm and the ears may be formed in the stamping operation and then when the stamping is bent to form the laminated arm the oil flow governing means is provided. A further operation may be found desirable if the faces 46 on the ears are to be provided with an increased lateral taper or slope, as mentioned, and this may be accomplished by suitable filing or cutting operations, as will be readily understood.

Normally, the amount or degree the ears should be bent can be predetermined and then during the stamping operation, this degree of bend can be obtained. However, the ears may be bent closer together or farther apart after manufacture of the arm so as to adjust the oil flow and it may be found desirable in some cases to initially form the ears with a greater bend than required and then to bend the ears toward each other in making adjustments as usually it will be found easier or more convenient to bend them towards each other than apart in making any desired adjustment. It is evident that the V-shape of the channel enables obtaining a fine adjustment through changing the angle between the ears.

The sectional view shown in Fig. 5 illustrates a laminated arm wherein the edge surface portions 50 are at the outer edges of the arm. This structure is obtained by folding the stamping in the opposite direction so as to place the shear surfaces innermost. In this case, the ears will be bent towards the opposite side of the stamping so that when the stamping is folded, as stated, the ears will still be separated to provide the oil controlling gates or V-shape channels. The construction, then, will be generally the same as that shown in Fig. 2, except that the surfaces 50 will be along the outer edges of the arms instead of along the inner edges, and the oil groove will be formed by the shear break edge portion 55.

During operation, the oil flows through the opening 40 and then along the arm until it reaches the dams where most of the oil is veered laterally and over the sides of the arm. A smaller part of the oil will flow on through the channels 48 and to the ends of the arm and if a groove is present such as formed by the surfaces 50, 50, the oil will flow through the groove. If the arm is formed as in Fig. 5, the oil will flow over the surfaces between the surfaces 50, 50 until it reaches the ends of the arm. By providing the upwardly inclined faces 46 on the ears, the latter naturally provide a greater impediment to oil flow and particularly the inclined faces resist any tendency of flow thereover due to speed of flow or due to centrifugal action occurring during oscillation of the arm. Locating the dams close to the opening also reduces the amount of centrifugal force on the oil and this factor also assists in preventing oil flow over the ears. It generally follows that the ears form effective dams while at the same time causing most of the oil to be spilled laterally off of the arm and allowing a smaller quantity to flow through the channel.

It should be understood that the V-shape passage or channel 48 between each pair of ears is of such depth that the bottom of the channel is substantially in line with and substantially constitutes a continuation of the groove between the surfaces 50, 50, although the passage 48 will, of course, be formed by side walls disposed at a smaller angle than that between such surfaces. In the arm shown by Fig. 5, the bottom of the channel 48 will be substantially in line with the top surface of the arm at each end of the channel. Also, in both types of arms, the level of the oil conducting surfaces, grooves and channels will be such as to allow oil to flow to the ends of the arm during operation.

Although more than one form of the invention has been illustrated and described in detail, it will be apparent to those skilled in the art that various modifications may be made without departing from the scope of the appended claims.

What is claimed is:

1. An engine rocker arm having a hub portion and an opening for lubricant extending from the hub portion to an intermediate point in one edge face of the arm, and means for controlling the flow of oil from the opening to one end of the arm and comprising a raised dam on the edge face of the arm located between the opening and said end of the arm and having a passage for limiting the amount of lubricant that can flow past the dam, the face of the dam next to said opening being angled relative to the plane of the arm so as to cause a substantial part of the oil flowing against the dam to be guided laterally over a side edge of the arm.

2. An engine rocker arm having a hub portion and an opening for lubricant extending from the hub portion to an intermediate point in one edge face of the arm, and means for controlling the flow of oil from the opening to one end of the arm and comprising a raised dam on the edge face of the arm located between the opening and said end of the arm and having a passage for limiting the amount of lubricant that can flow past the dam, the face of the dam next to said opening being inclined outwardly from the edge and towards the longitudinal center line of the opening so as to provide increased impedance to flow of oil past the dam.

3. An engine rocker arm having a hub portion and an opening for lubricant extending from the hub portion to an intermediate point in one edge face of the arm, and means for controlling the flow of oil from the opening to one end of the arm and comprising a raised dam on the edge face of the arm located between the opening and said end of the arm and having a passage for limiting the amount of lubricant that can flow past the dam, the face of the dam next to said opening being inclined outwardly from said edge and towards the longitudinal center line of the opening to increase the impedance to flow of oil over the dam and also being angled laterally relative to the plane of the arm so as to cause a substantial part of the oil flowing against the dam to be guided laterally over the side edge of the arm.

4. An engine rocker arm comprising laminations having an opening for receiving the shaft upon which the arm is to be mounted and a lubricant opening leading from said shaft opening to an edge face of the arm, and means for controlling the flow of lubricant from the opening to one end of the arm along said edge face and comprising raised ears on the laminations respectively between the lubricant opening and said end of the arm and which are bent apart to provide a V-shape passage through which the oil flows, said ears having their edge faces next to the lubricant opening inclined outwardly from said edge and towards the longitudinal center line of the opening so as to increase the impedance of the dam to oil flow thereover.

5. An engine rocker arm comprising laminations having an opening for receiving the shaft upon which the arm is to be mounted and a lubricant opening leading from said shaft opening to an edge face of the arm, and means for controlling the flow of lubricant from the opening to one end of the arm along said edge face and comprising raised ears on the laminations respectively between the lubricant opening and said end of the arm and which are bent apart to provide a V-shape passage through which the oil flows, said ears having their edge faces next to the lubricant opening inclined outwardly from said edge and towards the longitudinal center line of the openings so as to increase the impedance of the dam to oil flow thereover and also being angled laterally of the arm so as to cause a substantial part of the oil flowing against the dam to be guided laterally over the side edge of the arm.

6. An engine rocker arm comprising a body having an opening for receiving the shaft upon which the arm is to be mounted and a lubricant riser passage leading from said shaft opening to an upper edge face of the arm, and means for limiting the flow of lubricant longitudinally of the arm from the riser passage to one end of the arm along said edge face, comprising baffling walls carried by the body between the lubricant riser passage and said end of the arm and which have a restricted passage between them of lesser oil conductive capacity than said riser passage for limiting the oil flow, and a lateral unrestricted vent opening portion in said arm open to atmosphere and communicating with said riser passage below the top of said baffling walls and of greater oil conductive capacity than said restricted passage.

7. An engine rocker arm having a hub portion and an opening for oil extending from the hub portion towards an intermediate point in one edge face of the arm, and means for controlling the flow of oil from the opening to one end of the arm and comprising upstanding ear means on said edge of the arm and having a restricted oil passageway extending lengthwise of the arm and communicating with said opening and substantially unrestricted escape passageway portions formed in said arm and communicating with said opening below the tops of said ear means.

8. An engine rocker arm having a hub portion and an opening for oil extending from the hub portion to an intermediate point in one edge face of the arm, and a pair of upstanding dam means on said edge of the arm and disposed in spaced relation along the edge of the arm with the end of said opening located between such dam means, the space longitudinally between the two dam means defining a lateral slot between them which allows some oil to flow from the opening and spill laterally over the sides of the arm, one of said dam means having a passageway extending longitudinally of the arm and communicating said slot with the edge face of the arm at that side of the dam means opposite the slot whereby some oil will flow from the slot and through said passageway to the end of the arm.

9. An engine rocker arm having a hub portion and an opening for oil extending from the hub portion to an intermediate point in one edge face of the arm, and a pair of upstanding dam means on said edge of the arm and disposed in spaced relation along the edge of the arm with the end of said opening located between such dam means, the space longitudinally between the two dam means defining a lateral slot between them which allows some oil to flow from the opening and spill laterally over the sides of the arm, one of said dam means having a slot extending longitudinally from the lateral slot and to the opposite side of the dam means so some of the oil can flow from the lateral slot and through the longitudinal slot, the two portions of the last mentioned dam means bordering the longitudinal slot between them being bendable so that the dimensions of the slot may be varied.

10. An engine rocker arm having a hub portion and an opening for oil extending from the hub portion to an intermediate point in one edge face of the arm, said arm in the region of said intermediate point having a laterally extending slot communicating with the opening so that some oil from the opening can flow laterally through the slot and spill over the side of the arm, the lateral walls defining opposite sides of the slot constituting dams to impede the flow of oil along the edge face of the arm, one of the dams having a passageway extending longitudinally from the slot and to the edge face of the arm at a point spaced from the slot so that some oil may flow from the slot and through the passageway.

11. An engine rocker arm comprising laminations defining the body of the arm and a hub portion for supporting the arm, said arm having an opening leading from the hub portion and between the laminations to one longitudinal edge face of the arm, a pair of raised dam means on said edge of the arm disposed at opposite sides of the opening and defining a lateral slot between the dam means into which oil can flow and partially spill laterally over the sides of the arm, one of the dam means comprising laterally aligned, upstanding ears on the laminations respectively and which are bent apart laterally to provide a passageway communicating the slot with the edge face of the arm at that side of the ear means opposite the slot so that some oil from the slot can flow through said passageway and along the edge face of the arm.

12. An engine rocker arm comprising laminations defining the body of the arm and a hub portion for supporting the arm, said arm having an opening leading from the hub portion and between laminations to one longitudinal edge face of the arm, a pair of raised dam means on said edge of the arm disposed at opposite sides of the opening and defining a lateral slot between the dam means into which oil can flow and partially spill laterally over the sides of the arm, each of the dam means comprising laterally aligned, upstanding ears on the laminations respectively and which are bent apart laterally to provide passageways communicating the slot with the edge face of the arm at the sides of the dam means opposite the slot so that some oil from the slot can flow through said passageways and to opposite ends of the arm.

13. An engine rocker arm having a hub, an oil passage system formed in the arm and leading from the hub to an end portion of the arm to permit oil flow from the hub to said end portion, laterally spaced side walls defining a part of said passage system, and means for limiting the rate of possible oil delivery to said end portion of the arm comprising substantially unrestricted escape channel-defining portions open to atmosphere at one end and intersecting said passage system at a position which is below the highest parts of said side walls, and flow restricting portions of reduced oil conductive capacity located between said position of intersection and said end portion of the arm.

14. An engine rocker arm having a hub, an oil passage system formed in the arm and leading from the hub to an end portion of the arm to permit oil flow from the hub to said end portion, laterally spaced side walls defining a part of said passage system, and means for limiting the rate of possible oil delivery to said end portion of the arm comprising escape channel-defining portions open to atmosphere at one end and intersecting said passage system at a position which is below the highest parts of said side walls and which is between the hub and the said end portion of the arm when considered in the path of oil flow through said passage, said passage system including flow-restricting portions of reduced cross section and reduced oil conductive capacity as compared with the escape channel, said flow restricting portions being located between said position of intersection and said end portion of the arm.

15. An engine rocker arm having a hub, an oil passage system formed in the arm and leading from the hub to an end portion of the arm to permit oil flow from the hub to said end portion, laterally spaced side walls defining a part of said passage system, and means for limiting the rate of possible oil delivery to said end portion of the arm comprising escape channel-defining portions open to atmosphere at one end and intersecting said passage system at a position which is below the highest parts of said side walls and which is between the hub and the said end portion of the arm when considered in the path of oil flow through said passage system, said passage system including a riser opening extending from the hub to an intermediate point in one edge face of the arm, said intermediate point corresponding to said position of intersection, said means for limiting the flow of oil being located between the riser opening and said end portion of the arm and comprising a pair of upstanding ear-like wall portions on the edge face of the arm located between the opening and said end of the arm in aligned relation laterally of the arm and forming a part of said laterally spaced side walls, the passage between said walls restricting the oil flow along the edge face of the arm.

16. An engine rocker arm as defined in claim 14 formed of laminations and wherein said flow restricting portions comprise raised ears on the laminations which have a passage between them for controlling the oil flow.

JOHN R. WINTER, Jr.

REFERENCES CITED

The following references are of record in the file of this patent:

UNITED STATES PATENTS

| Number | Name | Date |
|---|---|---|
| 533,140 | Pratt | Jan. 29, 1895 |
| 1,278,195 | Noack | Sept. 10, 1918 |
| 1,449,611 | Konigslow | Mar. 27, 1923 |
| 1,701,563 | Griswold | Feb. 12, 1929 |
| 2,176,083 | Leake | Oct. 17, 1939 |
| 2,288,831 | O'Harrow | July 7, 1942 |
| 2,291,564 | Scott | July 28, 1942 |

FOREIGN PATENTS

| Number | Country | Date |
|---|---|---|
| 616,959 | France | Nov. 8, 1926 |
| 344,304 | Great Britain | Mar. 5, 1931 |